W. H. PAUL.
TIRE PROTECTOR.
APPLICATION FILED AUG. 8, 1914.

1,173,853.

Patented Feb. 29, 1916.
3 SHEETS—SHEET 1.

Witnesses
C. N. Walker
A. D. Morris

Inventor
William H. Paul,
By
Watson & Boyden,
Attorneys.

W. H. PAUL.
TIRE PROTECTOR.
APPLICATION FILED AUG. 8, 1914.
1,173,853.
Patented Feb. 29, 1916.
3 SHEETS—SHEET 2.
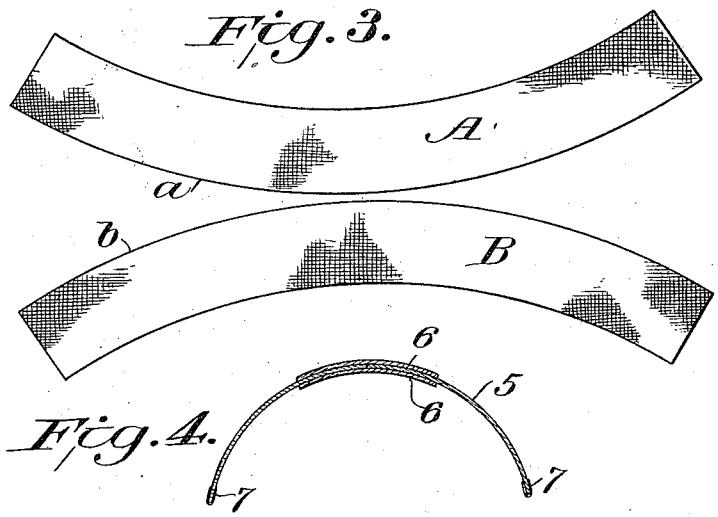
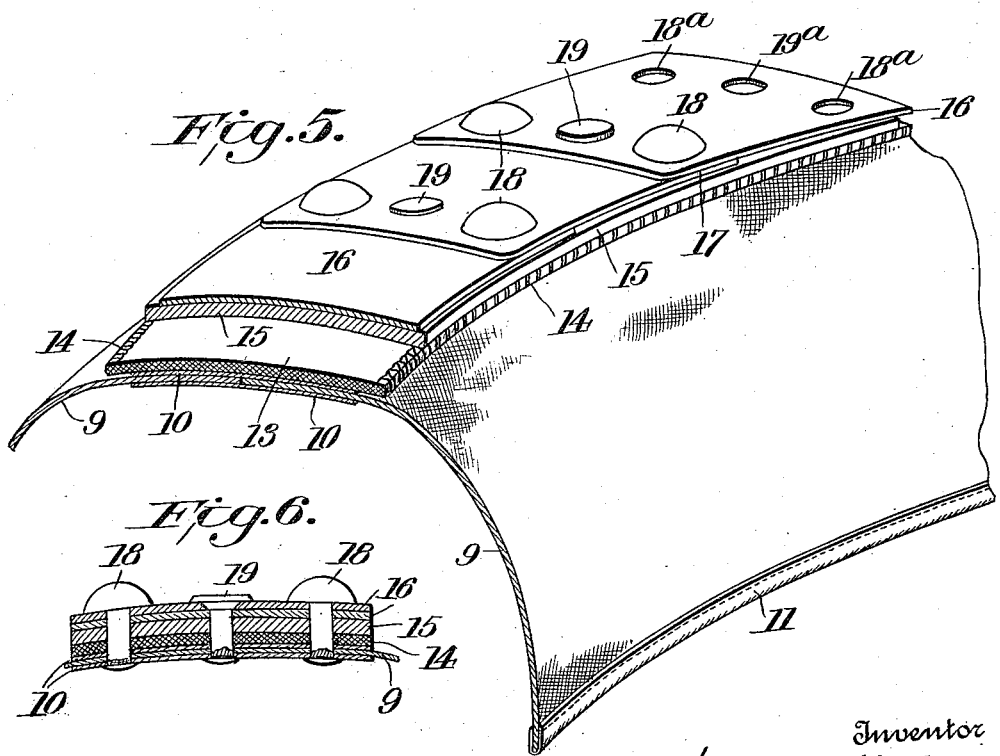

W. H. PAUL.
TIRE PROTECTOR.
APPLICATION FILED AUG. 8, 1914.

1,173,853.

Patented Feb. 29, 1916.
3 SHEETS—SHEET 3.

Fig. 7.

Fig. 8.

Witnesses
C. M. Walker.
H. D. Morris

Inventor
William H. Paul,
by
Watson & Boyden,
Attorneys

UNITED STATES PATENT OFFICE.

WILLIAM H. PAUL, OF BALTIMORE, MARYLAND.

TIRE-PROTECTOR.

1,173,853.

Specification of Letters Patent. Patented Feb. 29, 1916.

Application filed August 8, 1914. Serial No. 855,732.

*To all whom it may concern:*

Be it known that I, WILLIAM H. PAUL, a citizen of the United States, residing at Baltimore, in the State of Maryland, have invented certain new and useful Improvements in Tire-Protectors, of which the following is a specification.

My invention relates to pneumatic tires for vehicles, and more particularly to armored treads or protectors for such tires.

Many attempts have heretofore been made to provide puncture proof and wear resisting coverings for pneumatic tires, but they have, for the most part, been commercial failures because of inherent defects. One of such defects has been the overheating of the tire by reason of the friction occurring between the tire and covering.

An object of the present invention is to so construct and attach my improved covering that this objectionable friction will be substantially eliminated.

Another object is to provide a protective covering which, while permitting free flexing of the tire, shall be, at the same time, absolutely inextensible, circumferentially.

A still further object of the invention is to provide a tire protector of this nature, the efficiency of which will not be impaired by water or dampness.

With the above and other objects in view, the invention consists in a novel method of cutting and fitting a canvas covering, in an improved construction of armored tread, and in a new and effective combination of parts, all as hereinafter described and claimed.

Figure 1:
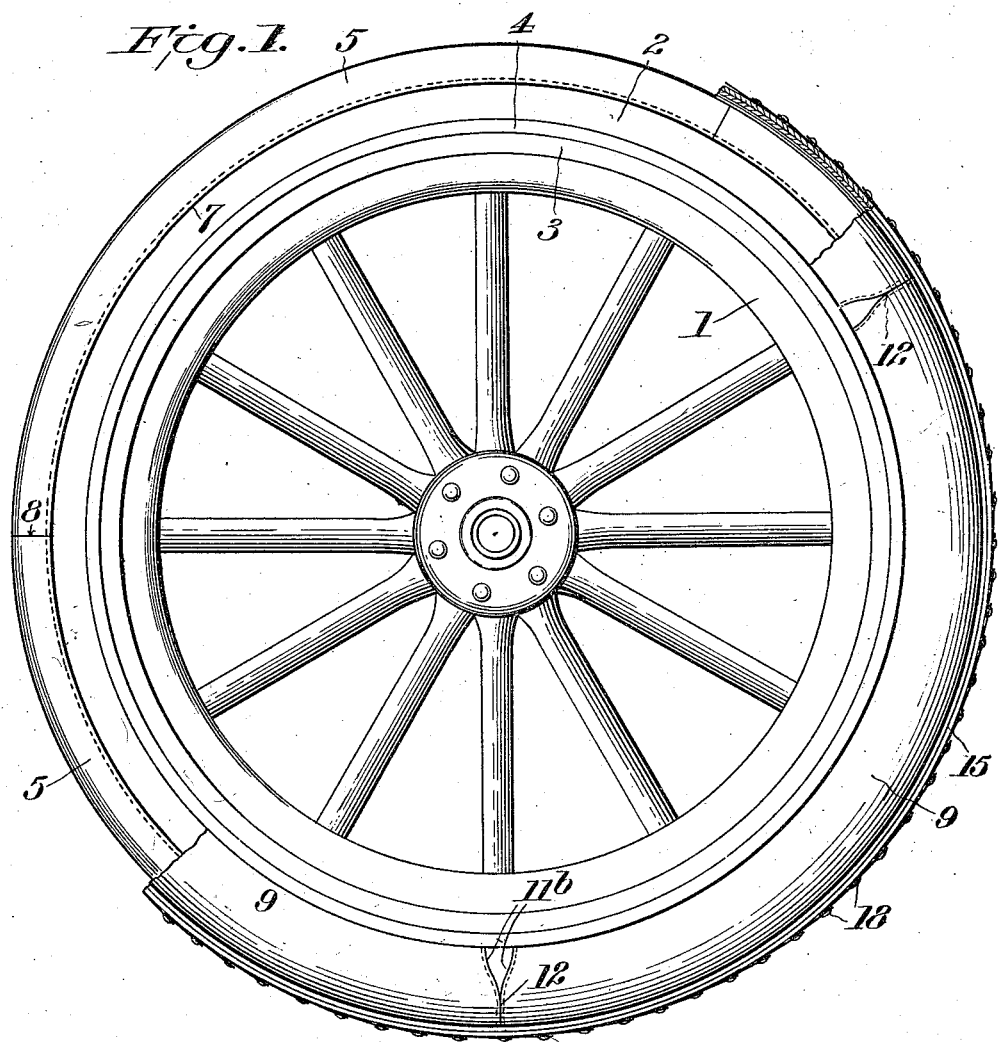
Figure 2:
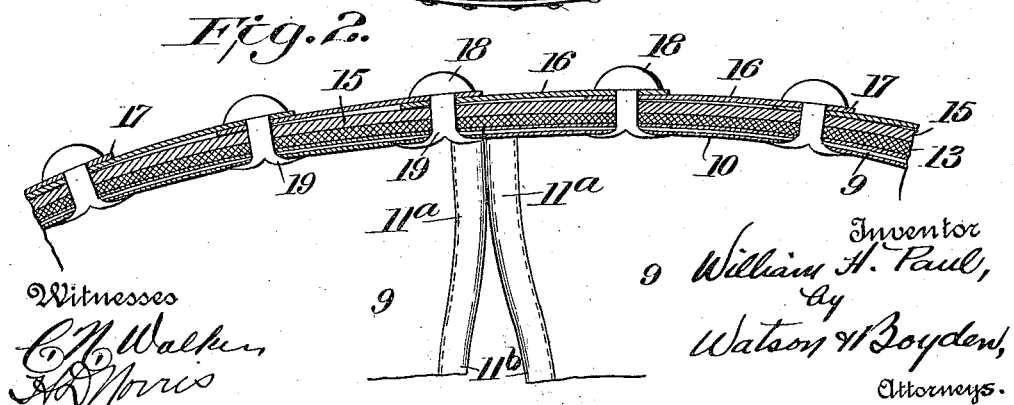

In order that the invention may be clearly understood, reference is had to the accompanying drawings, forming part of this specification, and in which;

Figure 1 is a side elevation of the wheel and tire showing my improved protector applied thereto, parts being broken away; Fig. 2 is a fragmentary longitudinal section on an enlarged scale through the protector showing the manner in which the parts are riveted together; Fig. 3 is a front view showing a pair of blanks from which one section of a part of the protector is formed; Fig. 4 is a cross sectional view showing such blanks assembled; Fig. 5 is a fragmentary perspective on an enlarged scale showing my improved protector, parts being in section; Fig. 6 is a transverse section through a line of rivets; Fig. 7 is a transverse section through a complete tire and wheel rim showing my improved protector applied thereto; and, Fig. 8 is a fragmentary sectional view of the protector showing a slightly modified construction.

Referring to the drawings in detail, 1 designates a wheel of any ordinary construction, and 2 a tire mounted thereon.

3 indicates a common form of locking ring or key, while 4 designates the clencher ring coöperating therewith. The tire 2 is gripped by the clencher ring 4 on one side and the turned-up edge 1ª of the rim on the other. The locking ring 3 is held by a flange 1ᵇ on the rim 1. These parts may be of the usual or any desired construction.

In order to prevent friction between the protector and the tire, I propose to first apply to the outer surface of the tire a close-fitting and permanently attached canvas covering. In prior attempts to provide canvas coverings for tires, it has been proposed to simply cut biased strips and lay them on the tire in such a way as to cause them to fit as well as possible. Such a construction, however, is unsatisfactory, since it is impossible to secure a covering in this way which tightly hugs the tire.

I have discovered that an absolutely close fit can be secured by forming the canvas covering in sections, each section being composed of two curved strips secured together along their convex edges. I have found in practice that the sections may be made as long as one-fourth or one-third of the circumference of the tire.

Referring to Fig. 3, A and B represent a pair of blanks or curved strips from which one of my improved sections is formed. These strips are arc shaped and the radius of curvature of their convex edges *a* and *b* is substantially equal to the radius of the outside of the tire. The convex edges *a* and *b* of such strips are brought into abutting relation and secured in position by means of stay strips 6 of light canvas, or the like, which are placed on both sides of the strips A and B, as clearly shown in Fig. 4 and stitched through and through. Referring to Fig. 4, this canvas covering formed of the strips A and B is indicated in its entirety by the reference numeral 5, the ends of which are cut off square and abut on radial lines as indicated at 8 in Fig. 1. The free edges of the sections A and B are preferably protected by means of a suitable binding 7, (see Fig. 4) to prevent raveling. It will be observed that this covering 5 extends only about half way around the outer surface of the tire, that is to say, it does not approach very closely to the rim on either side. This is also clear from an inspection of Fig. 7. After these sections have been formed in the manner shown in Figs. 3 and 4, they are placed upon the tire in the position shown in Fig. 1, and securely attached thereto by means of a waterproof cement. Over this inner covering of canvas, I then apply an outer covering or protector proper, formed as will be now described. This protector comprises a body portion 9 formed of heavy canvas. This canvas is cut into arc shaped strips similar to those shown in Fig. 3, and secured together in pairs by means of the stay strips 10, as illustrated in Fig. 5, so as to form curved sections. The strips from which the outer covering 9 is formed, however, are considerably wider than those illustrated in Fig. 3, so that such covering extends entirely around the outer surface of the tire, as shown in Figs. 1 and 7. Its free edges are preferably protected by means of a binding 11 of suitable material, such bound edges extending under and being gripped by the clencher rim on each side, as clearly shown in Fig. 7. From Figs. 1 and 2, it will be noted that the meeting ends of the sections 9 are preferably not cut upon true radial lines, but are curved as indicated at 11$^b$, thus forming openings for the escape of heat. Such edges are preferably protected by a binding 11$^a$ to prevent raveling.

In forming the complete protector I proceed as follows. I first assemble the sections 9 upon the tire over the covering 5 and secure them temporarily in position by means of a thin paste, or the like. Over the canvas sections 9 thus assembled, I place a band 13 of very heavy canvas, and cement this canvas band to the covering 9. The edges of this canvas band are preferably provided with over-lock stitches 14 to prevent raveling as clearly shown in Fig. 5. The assembled sections 9, united by the band 13, are then detached from the tire and placed upon a suitable curved anvil or form. A band 15 of leather of substantially the same width as the band 13 is then superposed upon the latter. Upon the band 15 are placed a series of metal plates 16, of substantially the same width as the band, each plate over-lapping the preceding plate as indicated at 17. The canvas covering 9, the canvas band 13, the leather band 15, and the plates 16 are then all securely fastened together by means of rivets 18 and 19 which pass through the parts at the point where each pair of plates over-laps. Preferably, two rivets 18 with large round heads are provided adjacent the outer edges of the bands, while a single smaller rivet, preferably with a flat head, is located between the rivets 18. The rivets 18 pass through holes 18$^a$ in the plates 16, while the rivet 19 passes through holes 19$^a$ in the plates 16, the hole 19$^a$ in the uppermost of the two plates being preferably countersunk, as shown in Fig. 6. The object of thus countersinking this hole is to enable the rivet 19 to hold after the head has been worn off. When the protector is first made, practically the entire wear will be taken by the large rivet heads 18, and as these wear away, the rivets 19 and the plates 16 will come in contact with the ground.

It will be understood that the ends of the protector or sheath shown in Fig. 5 are united so as to form an endless belt, flexible but absolutely inextensible, owing to the fact that the plates 16 are riveted directly to each other so as to form a chain. In many prior attempts which have been made to produce armored treads of this kind, the wear plates have been secured merely to a piece of leather or canvas, which, under certain conditions, will stretch and thus allow the tread to become loose. This is productive of destructive friction.

In practice, after having completed the endless protector comprising the covering 9, and the flexible armored tread carried thereby, I apply it to the tire while the latter is deflated. The protector is placed in position as shown in Figs. 1 and 7, with the free edges 11 of the canvas covering gripped between the clencher rim and the tire. This gripping action may be relied upon solely to hold the protector in place, or if desired, it may be cemented to the tire and to the inner canvas covering 5.

It will be understood that the protector is made of such length as to be slightly smaller than the outer periphery of the tire when inflated. When, therefore, it is applied to a deflated tire, and the tire then expanded by pumping air into the same, the tire swells out on each side of the inextensible tread belt, thus drawing the canvas covering 9 taut. The more the tire is inflated, therefore, the tighter the protector hugs the same and the more securely it is held in position by the clencher rim. Thus constructed, it is impossible for the protector to creep or travel over the surface of the tire. Moreover, the inner covering 5, which is permanently cemented to the tire, prevents any wear or friction of the tire itself. Owing to the fact that waterproof cement is employed, and to the further fact that canvas when wet tends to contract, it will be seen that water or dampness cannot deleteriously affect or injure the efficiency of my improved protector.

My novel method of cutting and forming the canvass coverings insures an absolutely close fit and produces a protector which will not wrinkle or pucker, but which will at all times lie smooth and tightly hug the surface of the tire.

Instead of the construction shown in Fig. 5, that illustrated in Fig. 8 may be employed if desired. The difference consists in placing the canvas band 14' on the inside of the outer canvas covering 9 instead of on the outside thereof. In this case, the band is laid over the inner covering 5 and then the sections 9 placed in position and cemented to the band.

What I claim is:

1. A protector for pneumatic tires comprising a canvas cover shaped to conform to the tire, a band of leather extending centrally around said canvas cover to form a tread, and a series of overlapping metal plates riveted to said band, each rivet passing through two plates, the leather band, and said canvas cover.

2. A protector for pneumatic tires comprising a canvas covering of uniform thickness cemented to the tire, and extending only substantially half way around the outer surface thereof, and a removable shoe comprising a second canvas covering wider than the first, and extending substantially around the entire outer surface of the tire, and overlying the first covering, and an armored tread band permanently secured to said outer covering.

3. A protector for pneumatic tires comprising a canvas cover shaped to conform to the tire, a central band of canvas overlying said cover, a band of leather superposed upon said canvas band, a series of metallic wear plates mounted upon said leather band, and rivets passing through said bands, plates, and canvas covering, and securing all of said parts permanently together 4. In a protector for pneumatic tires, an armored tread comprising a supporting band, and a series of overlapping metal plates mounted thereon, said plates being securely riveted to each other and to said band to form a flexible, inextensible belt.

5. In a protector for pneumatic tires, an armored tread comprising a compound supporting band formed of an inner strip of canvas and an outer strip of leather of substantially the same width, and a series of overlapping plates of equal width mounted upon said leather strip, said plates being riveted to both said canvas and leather strips, and to each other, to form a flexible, inextensible belt.

6. A tire protector comprising a canvas covering made up of a plurality of curved sections fitted end to end in abutting relation, each section being formed of a pair of arc-shaped strips having their convex edges abutting, and secured together by means of stay strips of light material sewed to the canvas, whereby the section is caused to conform to the curvature of the tire, and a tread band secured to the outside of said sections.

In testimony whereof I have affixed my signature, in presence of two witnesses.

WILLIAM H. PAUL.

Witnesses:
MORRIS R. PINDELL,
JOHN M. FENDLAY, Jr.

Copies of this patent may be obtained for five cents each, by addressing the "Commissioner of Patents, Washington, D. C."